(12) United States Patent
Richter et al.

(10) Patent No.: US 7,584,998 B2
(45) Date of Patent: Sep. 8, 2009

(54) INTERLOCKING ANCHORAGE AND METHOD OF INSTALLING A SEAT BELT ASSEMBLY

(75) Inventors: Steven J. Richter, St. Clair Shores, MI (US); George J. Strnad, Rochester, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 88 days.

(21) Appl. No.: 11/757,519

(22) Filed: Jun. 4, 2007

(65) Prior Publication Data

US 2008/0296881 A1    Dec. 4, 2008

(51) Int. Cl.
*B60R 22/00* (2006.01)
*B60R 22/18* (2006.01)
*B60R 22/22* (2006.01)
*B60R 22/26* (2006.01)
*B60R 22/30* (2006.01)

(52) U.S. Cl. ............ 280/801.1; 280/808; 403/353

(58) Field of Classification Search ........... 280/801.1, 280/801.2, 802, 803, 804, 805, 806, 807, 280/808; 24/68 SB; 297/453, 465, 468; 403/353
See application file for complete search history.

(56) References Cited

U.S. PATENT DOCUMENTS 4,109,962 A    8/1978    Magyar
4,222,609 A *  9/1980    Andersson ............... 297/468
4,482,188 A    11/1984   Tilly et al.
4,915,414 A    4/1990    Weman
6,142,525 A    11/2000   Boelstler et al.
6,481,750 B1 * 11/2002   Kalina et al. ............ 280/801.1
6,749,224 B1   6/2004    Stojanovski
7,021,709 B2 * 4/2006    Dolan et al. ............. 297/253
2004/0212188 A1* 10/2004 Terasaki ................... 280/806

FOREIGN PATENT DOCUMENTS

DE    69831625 T2    7/2006
FR    2326945        5/1977

* cited by examiner

*Primary Examiner*—Ruth Ilan
*Assistant Examiner*—Keith Frisby

(57) ABSTRACT

An anchorage mechanism is provided for structurally coupling at least two components in series to withstand tensile loads. The anchorage mechanism includes a lower anchor and an upper anchor. The lower anchor has a first end that includes a substantially flat surface having flange portions, and an opposing second end configured for connecting the lower anchor to one of the at least two components. The upper anchor has a first end defining a receiving portion and a second end defining a first opening configured to secure the upper anchor to a second of the at least two components. The receiving portion is configured in a first manner to receive the flange portions of the lower anchor, and configured in a second manner to interlock the upper anchor with the lower anchor to withstand tensile loads. A method of installing a seat belt assembly with the disclosed anchorage mechanism is also provided.

12 Claims, 6 Drawing Sheets

INTERLOCKING ANCHORAGE AND METHOD OF INSTALLING A SEAT BELT ASSEMBLY

TECHNICAL FIELD

The present invention relates to seat belt anchors for coupling a seat belt assembly to a motor vehicle.

BACKGROUND OF THE INVENTION

A seat belt assembly, commonly referred to as a passenger restraint system, is a type of harness system designed to restrain an occupant of an automobile or other motorized vehicle against inadvertent movement that may result from a collision or a sudden stop. Conventional seat belt systems employ a belt buckle or like element, which is positioned inboard from the occupant seating position, for engagement with a mating latch plate or fastener, generally provided outboard from the occupant seating position. Engagement of the buckle with the latch plate provides a belt or belt webbing across the body of a seated occupant for restraining the occupant against abrupt movement from the seat.

Due to the nature of the loads on the seat belt assembly during vehicle impact, the assembly has traditionally been mounted directly to the vehicle structure, generally utilizing a three-point attachment configuration. In this regard, the belt strap or webbing is attached to the vehicle floor pan by a belt retractor mounted rigidly thereto. The belt extends upwardly along the B-pillar and through a support member (i.e., a D-ring) mounted near the top of the B-pillar. The strap then extends downward, and is secured at a second end to the vehicle pan adjacent to the retractor. The latch plate is supported by the belt webbing and adapted to slide along the belt between the end anchored to the vehicle floor and the support-ring. The belt buckle is conventionally mounted to the vehicle pan by a buckle strap which extends through a gap between the bottom cushion and either the middle console or the back cushion of the seat. In a two-point attachment configuration (i.e., wherein a lap belt is provided), the second end of the belt webbing is generally rigidly secured to the latch plate instead of the floor pan, thereby eliminating a third attachment point.

It is also reasonable to mount the seat belt assembly directly to the vehicle seat assembly. By way of example, the seat belt retractor is affixed directly to the seat platform (i.e., the base of the seat frame.) The strap then extends upwards along the back-frame of the upper seat cushion and passes through a guide or upper support member mounted at the top of the seat frame, adjacent the head rest. The strap then extends downward, and is connected to the seat frame adjacent to the retractor. Conventional vehicle seats may be, by way of example, a bucket seat or a bench seat.

In the prior art, the buckle, belt, and webbing has typically been secured to the vehicle structure or seat frame via a seat belt anchor. Such anchor mechanisms typically consist of a single plate member with an oblong first opening for receiving the belt webbing, belt retractor, or buckle strap, and a circular second opening for attachment to the vehicle structure of seat frame. The second opening is generally sized to receive a plastic bushing or washer to provide a low friction surface for a fastener (i.e., a stepped bolt, rivet, stud, etc.) During installation, the fastener is received by and secured to the vehicle structure, which can be the seat frame, vehicle floor pan, a B or C pillar, or other part of the vehicle. Anchors of the prior art generally have to be installed into the cab structure prior to completion of the cab structure.

SUMMARY OF THE INVENTION

Accordingly, an interlocking anchorage mechanism is provided having an upper anchor member and a lower anchor member for structurally coupling two or more devices or components in series to withstand tensile loads.

In one embodiment of the present invention, the lower anchor has a first end which includes a substantially flat surface having one or more flanges. An opposing second end of the lower anchor is adapted to couple with one of the two or more aforementioned devices or components. Preferably, the first end of the lower anchor also defines a cavity or aperture proximate to the flanges.

The upper anchor has a first end which defines a receiving portion and a second end which defines at least a first opening. The first opening is configured to couple the upper anchor to a second of the two or more aforementioned devices or components. The receiving portion is configured in one manner to receive the flanges of the lower anchor, and is configured in a second manner to interlock the upper anchor to the lower anchor after the flange portions have been received. In this embodiment, both anchors are preferably preformed, one-piece members manufactured from a high-strength plastic.

Preferably, the second end of the upper anchor also defines a third opening that is adapted to align with the cavity of the lower anchor after the flanges are received by the receiving portion of the upper anchor and the two anchors interlock, thereby defining a channel for the receipt of a fastener. The fastener is preferably a push pin or stepped bolt, but can be any one of a rivet, a screw, a key, a retainer, a latch, a weld, or the like. It should be noted that the fastener is intended solely to confirm that the anchors are properly coupled to one another and to retain proper anchor interface. The fastener is not necessary for achieving the anchorage load requirements.

In a preferred variation of the first embodiment, the first end of the lower anchor includes a stepped surface, the flange portions ideally projecting laterally outward from the lower portion of the stepped surface. In addition, the receiving portion of the upper anchor is defined as a second, preferably T-shaped, opening configured in a first manner for orthogonal receipt of the flanges, and thereafter mates with the first end of the lower anchor in a second manner to thereby interlock the upper anchor to the lower anchor.

In an alternate embodiment, the substantially flat surface of the lower anchor defines the flange portions which extend laterally outward, creating a T-shaped profile at the first end of the lower anchor. Furthermore, the receiving portion of the upper anchor includes two or more stops. The stops are configured in a first manner for orthogonal receipt of the flange portions, and configured in a second manner to thereby interlock the upper anchor with the lower anchor to withstand tensile loads.

In yet another alternate embodiment, the flange portions project outward along a plane substantially normal to the substantially flat surface of the lower anchor. In addition, the receiving portion includes at least one, but preferably two indentations configured in a first manner for orthogonal receipt of the flange portions, and configured in a second manner to thereby interlock the upper anchor with the lower anchor to withstand tensile loads.

In an additional embodiment of the present invention, a seat belt assembly for a passenger seat assembly is provided. The seat belt assembly includes a latch member, a buckle member, a belt webbing, a fastener, and first and second load bearing members. The buckle member is coupled to either the passenger seat assembly or the vehicle structure, and is adapted to selectively attach to the latch member. The latch member is slidably mounted to the belt webbing, adapted to move between first and second ends of the belt webbing. At least one end of the belt webbing, i.e., the first end, is preferably retractably secured to either the vehicle structure or the passenger seat assembly.

The first load bearing member includes a first end that has one or more flanges and an aperture. An opposing second end of the lower anchor is adapted to connect to either the vehicle structure or the passenger seat assembly. The second load bearing member has opposing first and second ends which define first and second openings and a receiving portion. The receiving portion is configured to receive and mate with the flanges and thereby interlock the first load bearing member with the second load bearing member to withstand tensile loads. At least one end of the belt webbing, preferably a second end, is coupled to the first opening of the second load bearing member. The second opening is configured to align with the aperture of the first load bearing member and thereby define a channel when the receiving portion is in receipt of the one or more flanges. A fastener is disposed within the channel in order to confirm that the first load bearing member is properly interlocked with the second load bearing member, and to retain anchor interface.

Ideally, it is preferred that the second end of the first load bearing member is mounted to the passenger seat assembly (i.e., the seat frame), and not the vehicle structure, via a pretensioner. It is still further preferred that the first end of the belt webbing is retractably secured to the vehicle structure (i.e, a B or C pillar or the floor pan), and not the passenger seat assembly, via a retractor.

In a preferred variation of the additional embodiment of the present invention, the first end of the first load bearing member also includes a stepped surface having the one or more flanges displaced laterally outward from a substantially flat, lower stepped portion. In addition, the receiving portion of the second load bearing member defines a third opening configured to receive the flange portions and thereby interlock the first load bearing member with the second load bearing member. It is desired that the first opening is sufficiently oblong to accommodate coupling with the second end of the belt webbing. It is also ideal that the third opening have a T-shaped profile.

In an alternate embodiment, the first end of the first load bearing member further includes a substantially flat surface, the flange portions being displaced normal to the substantially flat surface. Additionally, the receiving portion includes one or more indentations configured for orthogonal receipt of the flange portions to mate with and thereby interlock the upper anchor with the lower anchor to withstand tensile loads.

In yet another embodiment of the present invention, the first end of the first load bearing member includes a substantially flat surface which defines the flange portions which extend laterally outward from the substantially flat surface. It is preferred that the receiving portion includes two or more stops configured for orthogonal receipt of the flange portions to mate with and thereby interlock the upper anchor with the lower anchor to withstand tensile loads.

An additional aspect of the present invention is to provide a novel method of installing a seat belt assembly having a belt webbing, a latch plate, and a belt buckle, into a vehicle having a seat assembly and vehicle structure, the method comprising the steps of: securing the belt buckle to either the seat assembly or the vehicle structure; coupling a first end of the belt webbing to either the seat assembly or the vehicle structure; coupling a second end of the belt webbing to a first end of an upper anchor, wherein the latch plate is slidably supported by the belt webbing and movable between the first and second ends of the belt webbing; coupling a first end of a lower anchor to either the seat assembly or the vehicle structure, the lower anchor having a second end defining flange portions configured to mate with a receiving portion defined by the second end of the upper anchor; mounting the seat assembly to the vehicle structure; and mating the flange portions of the lower anchor with the receiving portion of the upper anchor thereby interlocking the lower anchor to the upper anchor to withstand tensile loads. The method may also include, as an additional step, confirming that the upper anchor is interlocked with the lower anchor with a fastener. It is preferred, but not required, that the first end of the webbing is coupled to the vehicle structure and the first end of the lower anchor is coupled to the seat assembly.

The above features and advantages, and other features and advantages of the present invention, will be readily apparent from the following detailed description of the preferred embodiments and best modes for carrying out the invention when taken in connection with the accompanying drawings.

BRIEF DESCRIPTION OF THE DRAWINGS

FIG. 3c is a partial front-perspective view of the interlocking anchorage mechanism in accordance with the embodiment of FIG. 3a;

FIG. 4c is a partial front-perspective view of the interlocking anchorage mechanism in accordance with the embodiment of FIG. 4a;

FIG. 5a is a side-schematic view of a seat belt assembly for a seat assembly in accordance with a fifth embodiment of the present invention;

FIG. 5b is a partial perspective view of the interlocking anchorage mechanism secured to a pretensioner device in accordance with the embodiment of FIG. 5a; and FIG. 5c is a partial side-perspective view of the seat belt assembly of FIG. 5a illustrating the interlocking anchorage mechanism secured directly to the seat assembly in accordance with the embodiment of FIG. 5a.

DESCRIPTION OF THE PREFERRED EMBODIMENTS

Figure 1A:
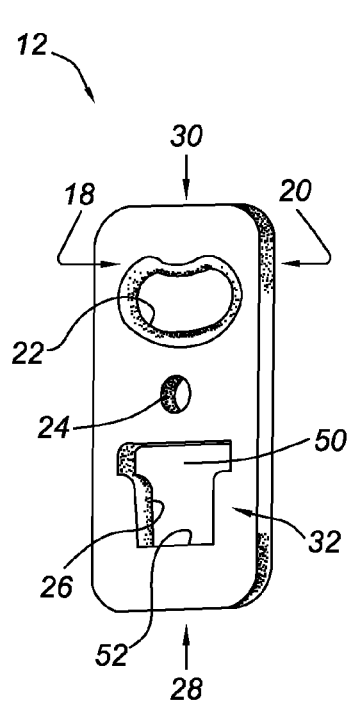
FIG. 1a is a perspective view of an upper anchor member in accordance with a first embodiment of the present invention.

Referring to the drawings, wherein like reference numbers refer to like components throughout the several views, an interlocking anchorage mechanism 10 is illustrated. The interlocking anchorage mechanism 10 consists of two primary components—a second load bearing member, also referred to as the upper anchor 12 of FIG. 1a, and a first load bearing member, also referred to herein as the lower anchor 14 of FIG. 1b. Preferably, the interlocking anchorage mechanism 10 also includes a fastener 16, as shown in FIG. 1c. The interlocking anchorage mechanisms illustrated herein are preferably configured as a seat belt anchor, as is demonstrated in FIGS. 5a-5c. However, it is considered that the present invention be employed in various other applications requiring the structural coupling of two or more devices or components in series to withstand tensile loads.

Referring to FIG. 1a, the upper anchor 12 is preferably a single, preformed, substantially flat rectangular plate member with rounded edges, that is constructed of any material known to have a suitable strength for the intended use of the interlocking anchorage mechanism 10, i.e., brushed steel or aluminum, high strength plastics, and finished with an anti-corrosive, anti-abrasion coating (i.e., dichromate paint, zinc plating, etc., not shown.) It is also considered to be within the scope of the present invention that the upper anchor 12 take on any functional shape within the scope of the present invention, such as, by way of example, a circular or pentagonal member with an elliptical or concave cross section. The upper anchor 12 includes opposing front and rear faces 18, 20, which define at least two, but preferably three openings 22, 24, and 26, disposed between first and second ends, indicated generally as 28 and 30, respectively.

The first opening 22 is sized, shaped, and/or contoured according to the required or intended use of the interlocking anchorage 10. According to FIG. 1a, the first opening 22, is preferably located at the second end 30 of the upper anchor 12, has an oblong profile, intended for coupling, mating, or securing the upper anchor 12 to one of the aforesaid devices or components. For example, if the interlocking anchorage mechanism 10 is used as a seat belt anchor (see FIG. 5a), the second opening 22 is preferably smoothly finished in an aesthetically pleasing manner so as to couple with, but not damage or fray, a seat belt webbing (406, FIG. 5a) attached thereto.

Similar to the first opening 22, the second opening 24 is sized, shaped, and/or contoured appropriately, according to the required or intended use of the interlocking anchor 10. FIG. 1a illustrates the second opening 24 with a circular profile, intended to receive the fastener 16 (FIG. 1c), as is depicted schematically in FIG. 1d. Although illustrated in FIG. 1c between the first and third openings 22, 26, the second opening 24 may be repositioned at alternate locations along the upper anchor 12, depicted in the exemplary, alternate embodiment of FIG. 2, as will be described in detail below.

Still referring to FIG. 1a, the third opening 26 is sized, shaped, and/or contoured appropriately according to the required or intended use of the interlocking anchorage mechanism 10. The third opening 26 is preferably located at the first end 28 of the upper anchor 12. It is further desired that the third opening 26 includes a slot 50 and a landing 52, creating a generally T-shaped profile. The third opening 26 defines a receiving portion, identified generally as 32, configured to receive a portion of the lower anchor 14, and interlock the upper anchor 12 to the lower anchor 14, as will be described in detail below. All of the receiving portions described herein are preferably configured in a first manner to receive a portion of the lower anchor 14, and configured in a second manner to interlock the upper anchor 12 to the lower anchor 14 to withstand the application of tensile loads (i.e., depicted in FIG. 1d by arrows F disposed along or parallel to axis A.)

Figure 1B:
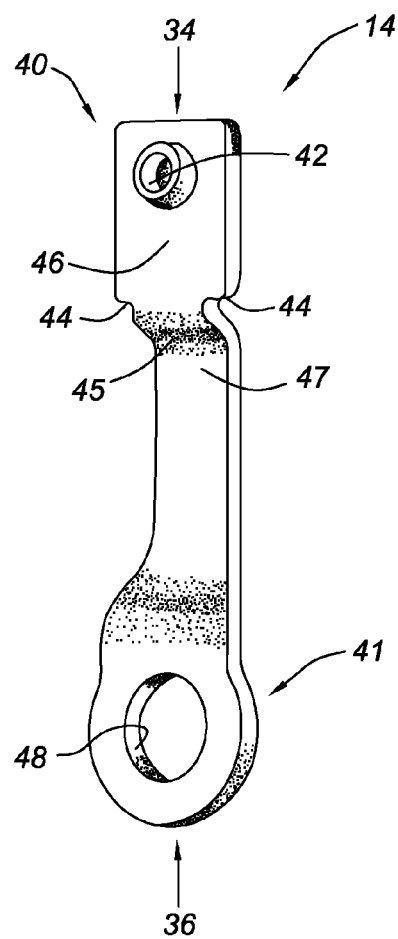
FIG. 1b is a perspective view of a lower anchor member in accordance with the first embodiment of the present invention.
Figure 1C:
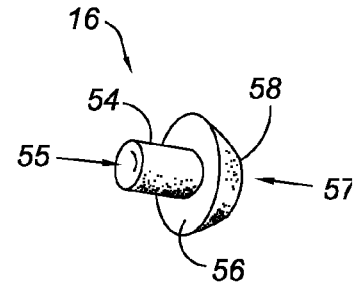
FIG. 1c is a perspective view of an exemplary fastener in accordance with the first embodiment of the present invention.
Figure 1D:
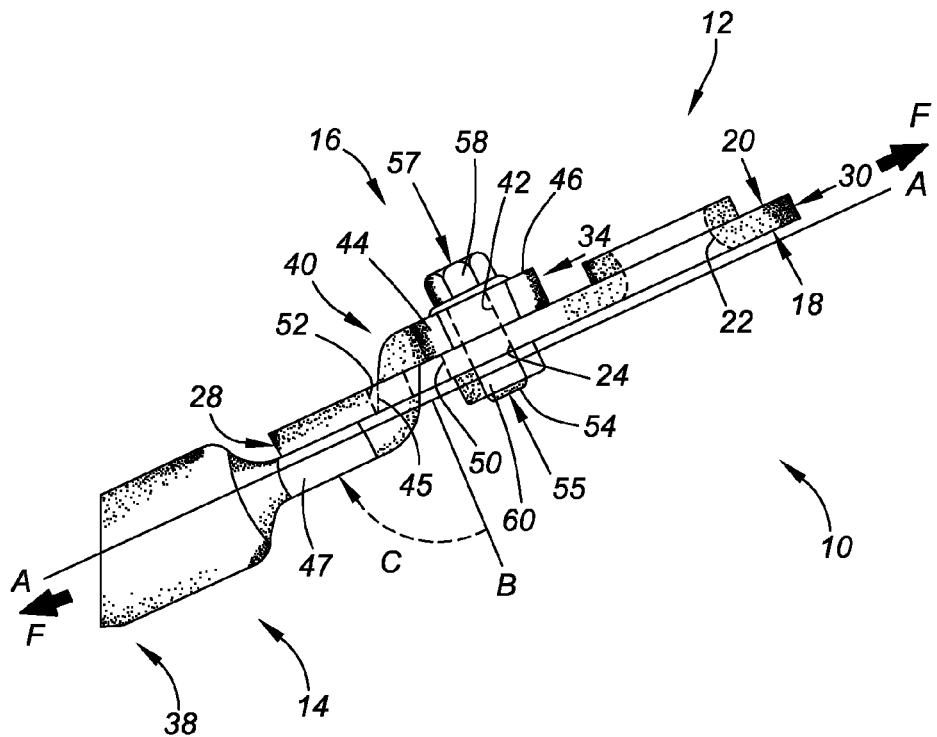
FIG. 1d is a partial side-schematic view of the interlocking anchorage mechanism of FIGS. 1a-1c illustrating the upper anchor member interlocking with the lower anchor member in accordance with the first embodiment of the present invention.

Turning to FIG. 1b, the lower anchor 14 is illustrated as a single, preformed, substantially flat elongated member having opposing first and second ends, indicated generally as 34 and 36, respectively. Similar to the upper anchor 12, the lower anchor 14 is constructed of materials having a suitable strength for the intended use of the interlocking anchorage mechanism 10 and finished with an aesthetically appealing, anti-corrosive coating (not shown). It is also considered to be within the scope of the present invention that the lower anchor 14 take on various other geometric shapes and cross sections. By way of example, FIG. 1d shows the lower anchor 14 with a substantially cylindrical midsection, identified generally as 38.

In the embodiment depicted in FIG. 1b, the first end 34 of lower anchor 14 includes a stepped surface 40 and a cavity or aperture 42. The stepped surface 40, which is preferably flat at the lower and upper stepped portions 46, 47, respectively, includes at least one, but preferably two flange portions 44 projecting laterally outwards from the lower stepped portion 46 of the stepped surface 40. The second end 36 of the lower anchor 14 is adapted to couple with one of the two or more abovementioned devices or components. By way of example, the second end 36 can include a second stepped surface 41 which defines a circular hole 48 that is sized to receive a plastic bushing (not shown). The plastic bushing is adapted to provide a low friction surface for a connector, such as a stepped bolt (shown in FIG. 5c as 460), retained therein by a nut and washer (not shown), to attach the lower anchor 14 to a portion or component of the seat assembly (e.g., 402, FIG. 5c.)

The aperture 42 of the lower anchor 14 is sized, shaped, and/or contoured appropriately according to the required or intended use of the interlocking anchorage mechanism 10. FIG. 1b illustrates the aperture 42 with a circular profile, intended to receive the fastener 16 (FIG. 1c.) The aperture 42 is depicted in FIG. 1b as being disposed on the lower stepped portion 46 of the stepped surface 40. However, the aperture 42 may be repositioned at alternate locations along the first end 34 of the lower anchor 14, as depicted by the exemplary, alternate embodiment of FIG. 2, as will be described below.

Referring to FIG. 1c, the fastener 16 is depicted in a preferred embodiment. The fastener 16 includes a narrow diameter portion 54 at a first end 55 of the fastener 16, which may have a smooth surface texture if the fastener 16 is a push pin, as depicted in FIG. 1c, or may be threaded to interface with a nut 60, as shown in FIG. 1d. The fastener 16 also has a shouldered portion 56 and a head 58 at the second end 57 of the fastener 16. The head 58 can take on many shapes, such as circular, hexagonal or square, and a screw driver slot (not shown) may also be provided in the center of the head 58.

FIG. 1d is a side-schematic view of the interlocking anchorage mechanism 10, illustrating how the lower anchor 14 is received by, mates with, and interlocks to the upper anchor 12 to withstand tensile loads F. In the embodiment of FIG. 1d, the receiving portion 32 is configured in a first manner to receive the flange portions 44 of the lower anchor 14 by slot 50 of the third opening 26. More specifically, the lower anchor 14 is displaced along and parallel to plane B, which is substantially orthogonal to axis A, so as to feed the first end 34 through the slot 50 of the upper anchor 12. Once the step 45 of the lower anchor 14 is proximate to the front face 18 of the upper anchor 12, the lower anchor 14 is tilted, shifted, or swung approximately 90 degrees (as illustrated by the dashed arrow C in FIG. 1d), thereby positioning the upper stepped portion 47 proximate to the front face 18 of the upper anchor 12 and the lower stepped portion 46 proximate to the rear face 20 of the lower anchor 12. The receiving portion 32 is configured in a second manner to interlock the upper anchor 14 to the lower anchor 12 by sliding or shifting the two anchors 12, 14 in opposite directions along axis A, in a shearing type motion, to thereby abut the step 45 against the landing 52 of the third opening 26 and the flanges 44 against the rear face 20 of the upper anchor 12.

Still referring to FIG. 1d, the second opening 24 of the upper anchor 12 is adapted to sufficiently align with the cavity 42 of the lower anchor 14 after the flanges 44 are received by the third opening 26, defining a channel for receipt of the fastener 16. FIG. 1d illustrates the fastener 16 being received by the first end 34 of the lower anchor 14 via cavity 42 along a path substantially parallel to plane B. The narrow diameter portion 54 is thereafter passed through the upper anchor 12 via the second opening 24 to abut the shouldered portion 56 against the lower stepped portion 46 of the lower anchor 14. Finally, a nut 60 is received by the fastener 16 at the first end 55 to trap or lock the fastener 16 to the interlocking anchorage mechanism 10. Alternatively, the fastener 16 could be received first by the second opening 24, and thereafter passed through the cavity 42 to receive the nut 60. As noted above, the nut 60 may be eliminated, i.e., in applications where the fastener 16 is a push pin (FIGS. 1b and 1c), a weld (not shown), or a rivet (not shown.) Furthermore, the cavity 42 and/or the second opening 24 could also include a lip portion or step (not shown) allowing the head 58 and/or the nut 60 of the fastener 16 to sit substantially flush with the upper and lower anchors 12, 14.

The two primary components in the interlocking anchorage mechanism 10, i.e., to allow the structural coupling of two or more devices or components in series to withstand tensile loads, are the upper and lower anchors 12, 14. The fastener 16 is intended primarily to confirm the interconnection of the two anchor members 12, 14 and to retain anchor interface until a load is applied. In other words, the two anchor members 12, 14, by design, stay engaged under load without dependence upon a third member (i.e., fastener 16.) Consequently, the fastener 16 is not a vital component to the function of the present invention. In this regard, the fastener 16 may take on various additional forms, such as, but not limited to, a rivet, a screw, a key, a retainer, a latch, a weld, or the like.

Figure 2:
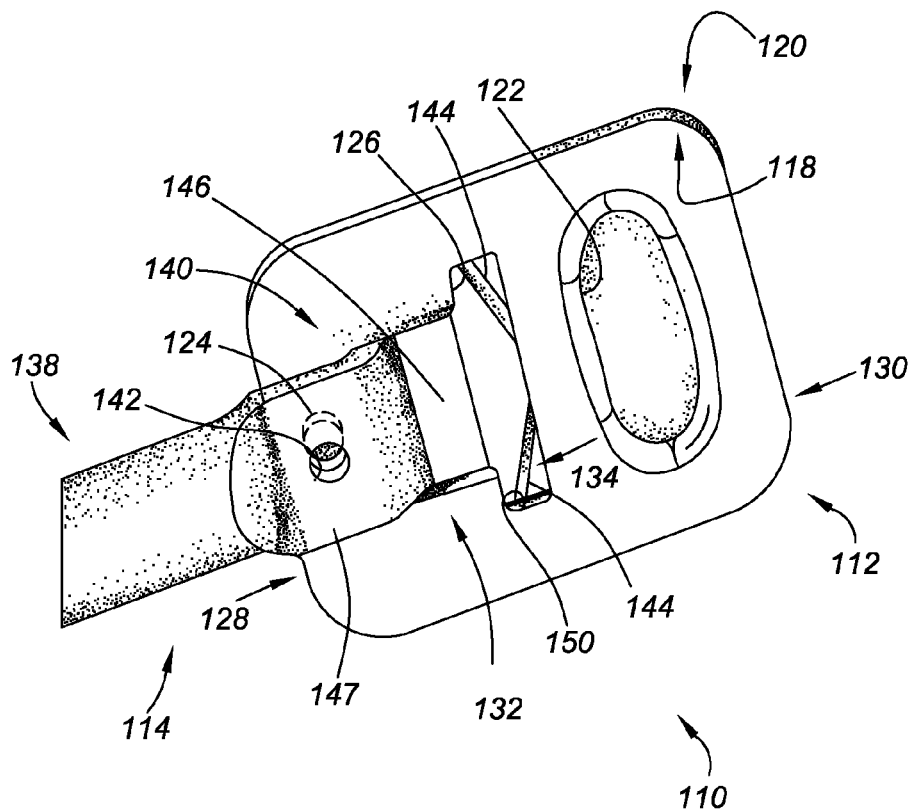
FIG. 2 is a partial perspective view of the interlocking anchorage mechanism of FIG. 1d, illustrating the fastener channel in accordance with a second embodiment of the present invention.

FIG. 2 illustrates an interlocking anchorage mechanism 110 in accordance with a second embodiment of the present invention. The interlocking anchorage 110 includes an upper anchor 112 and a lower anchor 114, operating as described with respect to FIGS. 1a-1d. The lower anchor 114 has a first end 134 defining a substantially flat, stepped surface 140 and a cavity or aperture 142, a cylindrical midsection 138, and a second end (not shown.) The stepped portion 140 includes at least one, but preferably two flange portions 144 projecting laterally outwards from the lower stepped portion 146 of the stepped surface 140. The upper anchor 112 includes opposing front and rear faces 118, 120, which define at least two, but preferably three openings 122, 124, and 126, disposed between first and second ends, indicated generally as 128 and 130, respectively. The first, second, and third openings 122, 124, 126 of FIG. 2, are sized, shaped, and contoured to function similar to the first, second, and third openings 22, 24, 26, respectively, as described above and illustrated in FIGS. 1a and 1d.

FIG. 2 illustrates the interlocking anchorage mechanism 110 with the cavity 142 positioned at a second alternate location along the first end 134 of the lower anchor 114, namely, at the upper stepped portion 147 of the stepped surface 140. Accordingly, the location of the second opening 124 is positioned at a corresponding second location along the upper anchor 112. However, the interlocking anchorage mechanism 110 still operates as described above in conjunction with the embodiment depicted in FIGS. 1a-1d. More specifically, the lower anchor 114 is received by, mates with, and interlocks to the upper anchor 112, according to the description above, to withstand tensile loads F. Furthermore, the second opening 124 of the upper anchor 112 is adapted to sufficiently align with the cavity 142 of the lower anchor 114 after the flanges 144 are received by the third opening 126, defining a channel for receipt of the fastener, shown in FIG. 2.

Figure 3A:
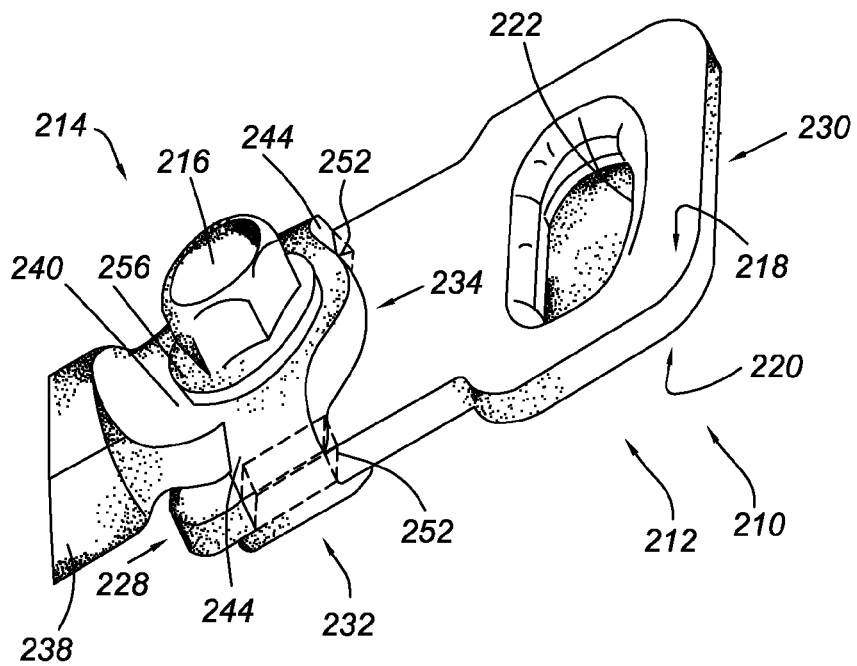
FIG. 3a is a partial perspective view of the interlocking anchorage mechanism in accordance with a third embodiment of the present invention.

Turning now to FIG. 3a, an exploded partial perspective view of an interlocking anchorage mechanism 210 in accordance with a third embodiment of the present invention is illustrated. The interlocking anchorage 210 includes an upper anchor 212, a lower anchor 214, and a fastener 216. The fastener 216 is configured to operate synonymously with the fasteners 16, described above with respect to FIG. 1d.

Akin to the embodiments of FIGS. 1a-2, the upper anchor 212 is preferably a single, preformed substantially flat plate member, constructed of a material having a suitable strength for the intended application of the interlocking anchorage mechanism 210. It is also contemplated that the upper anchor 212 take on any functional shape within the scope of the present invention.

Figure 3B:
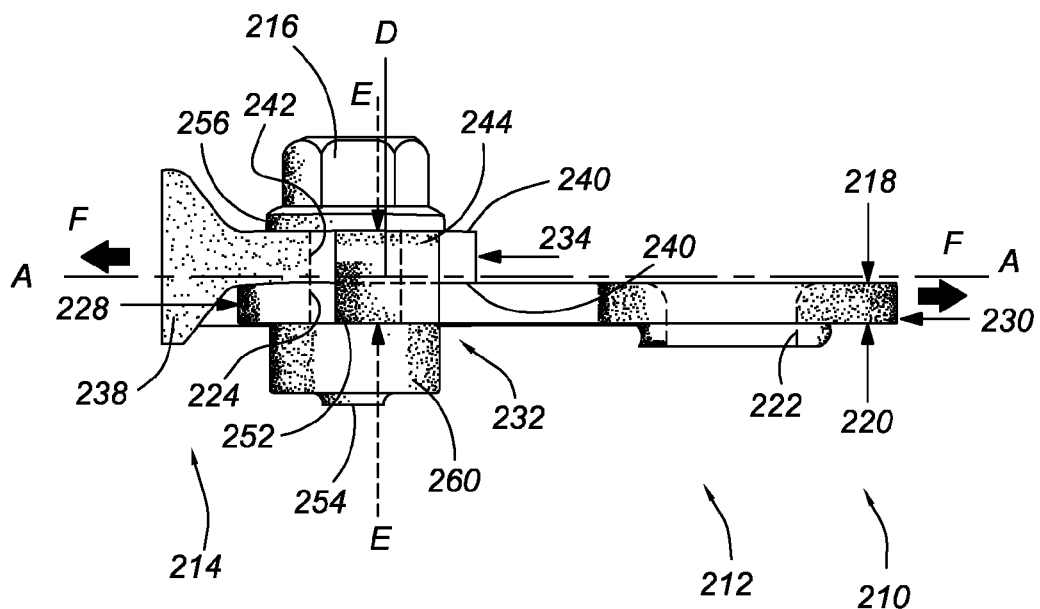
FIG. 3b is a partial side-schematic view of the interlocking anchorage mechanism of FIG. 3a illustrating the upper anchor member interlocking with the lower anchor member in accordance with the third embodiment of the present invention.
Figure 3C:
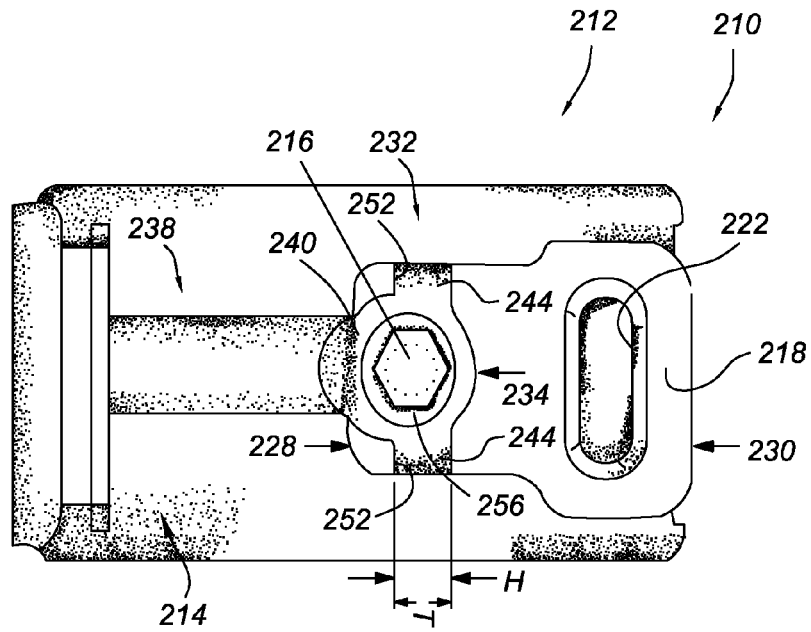

FIGS. 3b and 3c are partial schematic views of the interlocking anchorage mechanism 210, illustrating the upper anchor 212 interlocking with the lower anchor 214 in accordance with the third embodiment of FIG. 3a. The upper anchor 212 includes opposing front and rear faces 218, 220, which define at least a first opening 222, but preferably also a second opening (illustrated in FIG. 3b in phantom as 224), disposed between first and second ends, indicated generally as 228 and 230, respectively. The first and second openings 222, 224 are sized, shaped, and contoured to function similar to the first opening 22, 122 and second opening 24, 124, respectively, as described above and illustrated in FIGS. 1a-2. The first end 228 of the upper anchor 212 defines a receiving portion, identified generally as 232, configured in a first manner to receive a portion of the lower anchor 214, and configured in a second manner to interlock the upper anchor 212 to the lower anchor 214. The receiving portion 232 is illustrated in FIG. 3a as two opposing indentations or notches, indicated in phantom as 252. Nevertheless, it should also be understood that the receiving portion 232 of the present embodiment may consist of numerous notches, or a single notch.

Still referring to FIGS. 3b and 3c, the lower anchor 214 is preferably a single, preformed member constructed of materials having a suitable strength for the intended application of the interlocking anchorage mechanism 210. The lower anchor 214 has a cylindrical midsection 238, a first end 234, and a second end (not shown.) The shape and material of the lower anchor 214 is modifiable as described with respect to the lower anchors 14, 114 of FIGS. 1d and 2, respectively.

The first end 234 defines a substantially flat surface 240 and a cavity or aperture (illustrated in phantom in FIG. 3b as 242). The surface 240 includes at least one, but preferably two arcuate flange portions 244 that project outward along a plane normal to the surface 240 (i.e., parallel to plane D, as best seen in FIG. 3b.) The aperture 242 of the lower anchor 214 is sized, shaped, and contoured to function similar to the aperture 42, 142 as described above and illustrated in FIGS. 1d and 2, respectively.

FIG. 3b is a partial side-schematic view of the interlocking anchorage mechanism 210, illustrating how the lower anchor 214 is received by, mates with, and interlocks to the upper anchor 212 to withstand tensile loads, illustrated by the arrows F. In the embodiment of FIG. 3b, the receiving portion 232 is configured in a first manner to receive the flange portions 244 by the indentations 252 of the upper anchor 212. More specifically, the first end 234 of the lower anchor 214 is displaced along plane D, which is substantially orthogonal to axis A, thereby positioning the substantially flat surface 240 of the lower anchor 214 proximate to the front face 218 of the upper anchor 212. The receiving portion 232 is configured in a second manner to interlock the upper anchor 212 to the lower anchor 214 by pushing, pressing, or squeezing, the two anchors 212, 214 together (illustrated by the dashed arrows E of FIG. 3b) thereby abutting the flat surface 240 of the lower anchor 214 against the front face 218 of the upper anchor 212, and positioning the flange portions 244 substantially inside the indentations 252. See also FIG. 3c. Preferably, the height H of the indentations 252 is substantially equivalent to the thickness T of the flange portions 244 to provide a tight or "snug" fit between the upper anchor 212 and the lower anchor 214, as best seen in FIG. 3c.

Functioning as described with respect to FIGS. 1d and 2, the second opening 224 of the upper anchor 212 is adapted to sufficiently align with the cavity 242 of the lower anchor 214 after the flanges 244 are received by the indentations 252, defining a channel for receipt of the fastener 216, as best seen in FIG. 3b. The narrow diameter portion 254 is passed through the lower anchor 214 via the cavity 242, and through the second opening 224 of the upper anchor 212 to abut the shouldered portion 256 against the surface 240 of the lower anchor 214. A nut 260 is received by the narrow diameter portion 254 to trap or lock the fastener 216 to the interlocking anchorage mechanism 210, thereby confirming the interconnection between the two anchor members 212, 214 and retaining anchor interface, as best seen in FIGS. 3b-3c. Synonymous with the fasteners 16 depicted in FIG. 1d, the fastener 216 (FIGS. 3a-3c) may alternatively be received first by the second opening 224 of the upper anchor 212, and thereafter passed through the cavity 242 of the lower anchor 214 to receive the nut 260. Similarly, the fastener 216 and may take on various additional forms, such as, but not limited to, a push pin, a rivet, a screw, a key, a retainer, a latch, a weld, or the like.

Figure 4A:
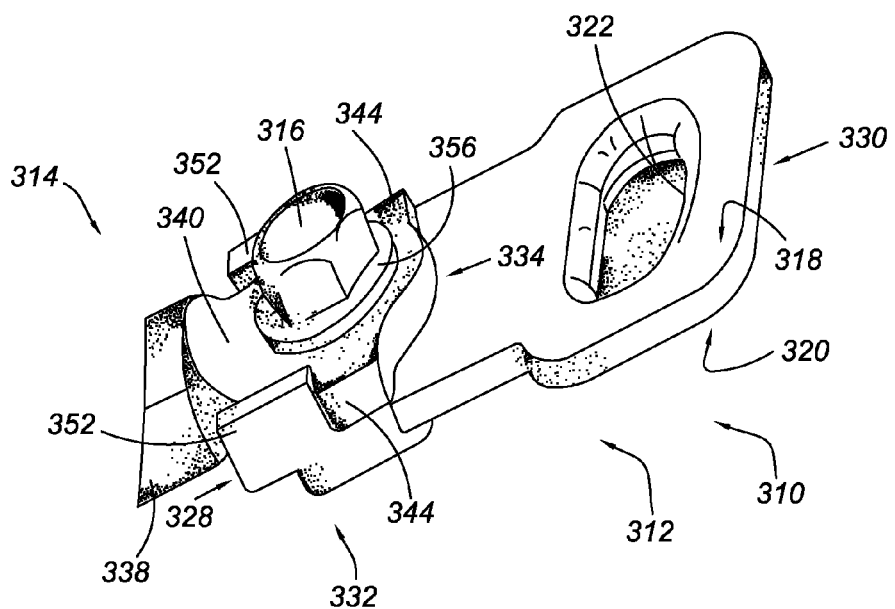
FIG. 4a is a partial perspective view of the interlocking anchorage mechanism in accordance with a fourth embodiment of the present invention.

FIG. 4a is a partial perspective view of an interlocking anchorage mechanism 310 in accordance with a third embodiment of the present invention is illustrated. The interlocking anchorage 310 includes an upper anchor 312, a lower anchor 314, and a fastener 316. The fastener 316 is configured to operate synonymously with the fastener 16, 216 as described above with respect to FIGS. 1d and 3a.

Consonant with the embodiments of FIGS. 1a-3c, the upper anchor 312 of FIG. 4a is preferably a single, preformed substantially flat plate member, constructed of a material having a suitable strength for the intended application of the interlocking anchorage mechanism 310. It is also contemplated that the upper anchor 312 take on any functional shape within the scope of the present invention.

Figure 4B:
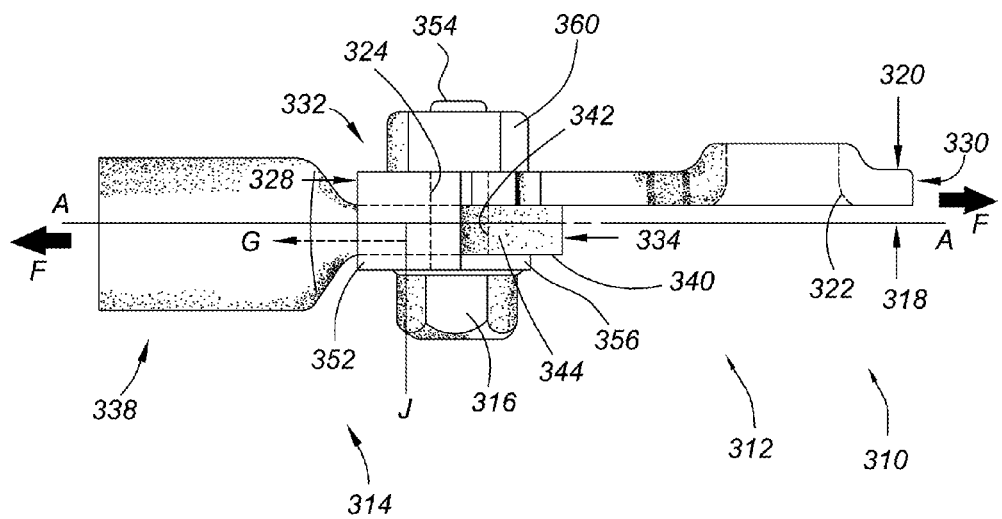
FIG. 4b is a partial side-schematic view of the interlocking anchorage mechanism of FIG. 4a illustrating the upper anchor member interlocking with the lower anchor member in accordance with the fourth embodiment of the present invention.
Figure 4C:
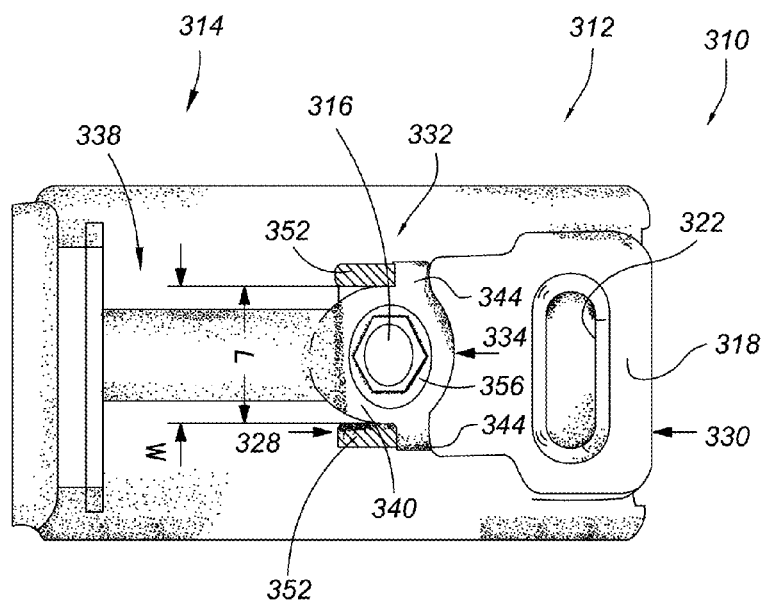

FIGS. 4b and 4c are partial schematic views of the interlocking anchorage mechanism 310, illustrating the upper anchor 312 interlocking with the lower anchor 314 in accordance with the fourth embodiment depicted in FIG. 4a. The upper anchor 312 includes opposing front and rear faces 318, 320, which define at least a first opening 322, but preferably also a second opening (illustrated as phantom lines 324, FIG. 4b), disposed between first and second ends, indicated generally as 328, 330, respectively. The first and second openings 322, 324, are sized, shaped, and contoured to function similar to the first opening 22, 122, 222 and second opening 24, 124, 224, respectively, as described above and illustrated in FIGS. 1a-3c. The first end 328 of the upper anchor 312 defines a receiving portion, identified generally as 332, configured to receive a portion of the lower anchor 314, and interlock the upper anchor 312 to the lower anchor 3 14. The receiving portion 232 is illustrated in FIG. 4a as including two tabs, also referred to herein as stops 352. Nevertheless, it should also be understood that the receiving portion 332 of the present embodiment may consist of numerous stops or a single stop (not shown.)

Still referring to FIGS. 4b and 4c, the lower anchor 314 is preferably a single, preformed member constructed of a material having a suitable strength for the intended application of the interlocking anchorage mechanism 310. The lower anchor 314 has a cylindrical midsection 338, a first end 334, and a second end (not shown.) The shape and material of the lower anchor 314 is modifiable as described with respect to the embodiment of FIGS. 1a-1d.

The first end 334 defines a substantially flat surface 340 and a cavity or aperture (illustrated in FIG. 4b by phantom lines 342). The surface 340 includes at least one, but preferably two flange portions 344 projecting laterally outwards from the surface 340. The aperture 342 of the lower anchor 314 is sized, shaped, and contoured to function similar to the aperture 42, 142, 242 as described above and illustrated in FIGS. 1d, 2 and 3b, respectively.

FIG. 4b is a side-schematic view of the interlocking anchorage mechanism 310, illustrating how the lower anchor 314 is received by, mates with, and interlocks to the upper anchor 312 to withstand tensile loads, illustrated by the arrows F. In the embodiment of FIG. 4b, the receiving portion 332 is configured in a first manner to receive the flange portions 344 by the stops 352. More particularly, the lower anchor 314 is translated in a manner substantially parallel to the upper anchor 312 along plane J, which is essentially orthogonal to axis A, to abut the surface 340 of the lower anchor 314 against the front face 318 of the upper anchor 312. Once the surface 340 is proximate to the front face 318, the receiving portion 332 is configured in a second manner to interlock the upper anchor 314 with the lower anchor 312 by sliding or shifting the lower anchor 314 downwards along axis A, as illustrated by the dashed arrow G in FIG. 4b, to thereby abut the flange portions 344 of the lower anchor 314 against the stops 352 of the upper anchor 312. Preferably, the distance L between the two stops 352 is substantially equivalent to the width W of the substantially flat surface 340 to provide a tight or "snug" fit between the upper anchor 312 and the lower anchor 314, as best seen in FIG. 4c.

Functioning as described with respect to FIGS. 1d-3c, the second opening 324 of the upper anchor 312 is adapted to sufficiently align with the cavity 342 of the lower anchor 314 after the flanges 344 are abutted against the stops 352, defining a channel for receipt of the fastener 316, as best seen in FIG. 4b (shown in phantom.) The narrow diameter portion 354 is passed through the lower anchor 314 via the cavity 342, and through the second opening 324 of the upper anchor 312 to abut the shouldered portion 356 against the surface 340 of the lower anchor 314. A nut 360 is received by the narrow diameter portion 354 to trap or lock the fastener 316 to the interlocking anchorage mechanism 310, thereby confirming the interconnection between the two anchor members 312, 314 and retaining anchor interface, as best seen in FIGS. 4a-4c. Synonymous with the fasteners 16, 216, as described with respect to FIGS. 1d and 3a, the fastener 316 (FIGS. 4a-4c) may alternatively be received first by the second opening 324 of the upper anchor 312, and thereafter passed through the cavity 342 of the lower anchor 314 to receive the nut 360. As such, the fastener 316 and may take on various additional forms, such as, but not limited to, a push pin, a rivet, a screw, a key, a retainer, a latch, a weld, or the like.

Figures 5A, 5B, 5C:
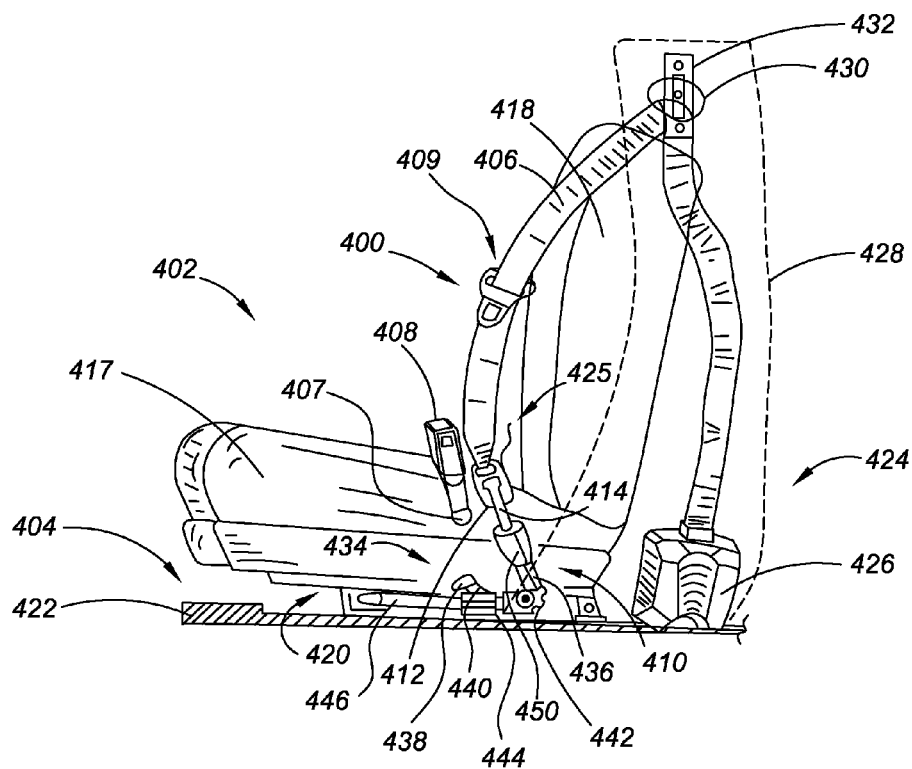

Turning now to FIGS. 5a-5b, the interior of a vehicle (i.e., automobile, airplane, train, etc.) is shown having a seat belt assembly, a seat assembly and vehicle structure, identified generally as 400, 402 and 404, respectively. The seat belt assembly 400 includes a length of retractable seat belt webbing 406, a belt buckle 408, a latch plate 409, and a second load bearing member 412 (also referred to herein as an upper anchor) and first load bearing member 414 (also referred to herein as a lower anchor) which define an interlocking anchorage 410. Preferably, the interlocking anchorage 410 also includes a fastener 416 configured as described with respect to the fastener 16, 216, 316, as illustrated in FIGS. 1d, 3b, and 4b, respectively.

The seat assembly 402 includes a seat bottom 417, a seat back 418, and a seat frame, indicated generally as 420. The frame 420 is conventionally mounted for adjusting movement relative to the vehicle floor pan 422 by a mechanical or electromechanical seat adjuster (not shown) which may be of the type which moves the seat assembly 402 fore and aft, or may be a six-way seat adjuster which allows the occupant (not shown) to tilt the seat bottom 417 in a forward or rear pitch, adjust the seat assembly 402 vertically upwards or downwards, and move the seat assembly 402 fore and aft.

FIG. 5a shows the belt webbing 406 in a preferred configuration, mounted at a first end, indicated generally by reference numeral 424, to the vehicle structure 404 via a belt retractor 426 secured to the floor pan 422. The first end 424 of the belt webbing 406 could also be mounted directly to the vehicle structure 402 (e.g., via floor pan 422,) eliminating the belt retractor 426, without compromising the function of the present invention. In this regard, it is also considered within the scope of the present invention that the first end 424 of the belt webbing 406 be attached to the seat assembly 402, for example, to the seat frame 420 via the retractor 426. The belt webbing 406 then extends upwards along a pillar (illustrated in FIG. 5a as a center or B-Pillar identified by shadow lines 428) which is equipped with a D-ring 430 or like element, to support the belt webbing 406 at a position near the vehicle roof (not shown). Preferably, the D-ring 430 is capable of adjusting its position by an anchor adjusting mechanism 432. After belt webbing 406 is passed through the D-ring 430, it extends downwards along the seat back 418 and is secured, in a known manner, to the upper anchor 412, as described in the various embodiments above.

The buckle 408 is preferably coupled by a buckle strap 407 or comparable element to the frame 420 of the seat assembly 402 or the vehicle structure 404 via e.g., the floor pan 422, preferably on the side of the seat assembly 402 opposite of the first end 424 of the belt webbing 406. The latch plate 409 is preferably supported by the belt webbing 406, and adapted to slide between the first and second ends 424, 425 of the belt webbing 406. Engagement or mating of the latch plate 409 with the buckle 408 disposes the belt webbing 406 across the occupant.

The second load bearing member 412 may take on the configuration of any one of the upper anchor embodiments 12, 112, 212, 312 as described with respect to FIGS. 1a-4c. Similarly, the first load bearing member 414 may take on a corresponding configuration of any one of the lower anchor embodiments 14, 114, 214, 314 as described with respect to FIGS. 1a-4c. Consequently, the second load bearing member 412 is configured to receive, mate with, and interlock to the first load bearing member 414 to withstand tensile loads, as described above. Ideally, the first load bearing member 414 protrudes through the opening 452 of the trim 450, the trim 450 providing an aesthetically pleasing appearance to the occupant and protecting the interlocking anchorage mechanism 410 from damage.

Preferably, the second end 436 of the first load bearing member 414 is attached to the frame 420 of the seat assembly 402 via a pretensioner device 434 (referred to hereinafter as the pretensioner), as best seen in FIGS. 5a and 5b. Alternatively, the interlocking anchorage 410 can be attached directly to vehicle seat 402, as shown in FIG. 5c. Although not shown, it is further contemplated that the second end 436 of the first load bearing member 414 be attached to the floor pan 422 of the vehicle structure 404 either directly, or via the pretensioner device 434. In general, the pretensioner 434 is a mechanism designed to preemptively constrict the belt webbing 406 about the occupant to eliminate slack and prevent the occupant from jerking forward in a crash scenario, thereby reducing the load exerted on the occupant. In the event of a crash, one or more sensors (not shown) transmit signal(s) to a triggering mechanism, identified as 438 in FIGS. 5a and 5c, which in turn actuates a piston, indicated generally as 444, which is connected in a shaft member 446. The first load bearing member 414 is connected to a guide arm 442, which is driven rearward, as indicated by the arrow R, by the piston 444. In the preferred embodiment, the piston 444, is driven rearward by explosively expanding gas contained in chamber 440.

An additional aspect of the present invention is to provide a novel method of installing a seat belt assembly having a belt webbing, a latch plate, and a belt buckle into a vehicle (i.e., an automobile, plane, train, etc.) having a seat assembly and vehicle structure. Although described below with respect to FIGS. 5a-5b, the following method may be employed in any the respective embodiments described above with respect to the structure illustrated in FIGS. 1a through 5c. Furthermore, the method described below may also be applied in various other motor vehicle applications requiring the structural coupling of two or more components in series to withstand tensile loads.

The method includes, as a first step, securing a belt buckle 408 to either the seat assembly 402 or the vehicle structure 404. Secondly, the first end 424 of the belt webbing 406 should be coupled to either the seat assembly 402 or the vehicle structure 404. The method further includes coupling the second end 425 of the belt webbing 406 to a first end (i.e., 30 of FIG. 1a) of the second load bearing member, or upper anchor 412, as a third step. In coupling the belt webbing 406 to the upper anchor 412, it is desired that the latch plate 409 be slidably supported by the belt webbing 406 and movable between the first and second ends 424, 425 of the belt webbing 406. In the preferred embodiment, the first end 424 of the belt webbing 406 is attached to the vehicle structure 404, and not to the seat assembly 402. It should be noted here that the abovementioned steps are interchangeable, the order of the steps not being relevant to the novelty or usefulness of the method.

Prior to, contemporaneously with, or subsequent to the completion of the first three steps, the fourth and fifth steps can be completed. The fourth step requires the first end of the second load bearing member, or lower anchor 414, be coupled to either the seat assembly 402 or the vehicle structure 404. The fifth step requires that the seat assembly 402 be mounted to the vehicle structure 404. Once the first five steps are completed, the sixth step requires that the lower anchor 414 be mated with the upper anchor 412 to thereby interlock the two anchors 412, 414, and structurally couple the belt webbing 406 to the seat assembly 404 or the vehicle structure 402. The method ideally includes confirming that the upper anchor 412 is properly interlocked with the lower anchor 414 with a fastener 416, as a seventh step.

Notably, it is preferred that the lower anchor 414 be coupled to the seat assembly 402, and not the vehicle structure 404. This would allow a vehicle manufacturer to install the belt webbing 406, the belt buckle 408, and the latch plate to the vehicle structure 402, thereafter install the fully assembled seat assembly 404 to the vehicle structure 402, and quickly attach the belt webbing 406 via the upper anchor 412 to the seat frame 420 via the lower anchor 414, which is protruding through the opening 452 of the trim 450.

While the best modes for carrying out the present invention have been described in detail, those familiar with the art to which this invention relates will recognize various alternative designs and embodiments for practicing the invention within the scope of the appended claims.

The invention claimed is:

1. A seat belt assembly for a passenger seat assembly operatively attached to a vehicle structure, the seat belt assembly comprising:
   a latch member;
   a buckle member operatively connected to one of the vehicle structure and the passenger seat assembly and configured to selectively attach to said latch member;
   a first load bearing member having first and second ends, wherein said first end includes flange portions and an aperture, and said second end is operatively connected to said one of the vehicle structure and the passenger seat assembly;
   a second load bearing member having first and second ends defining first and second openings, said first end of said second load bearing member having a receiving portion configured to receive and mate with said flange portions and thereby interlock said first load bearing member with said second load bearing member to withstand tensile loads;
   a belt webbing slidably supporting said latch member and having first and second ends, wherein said first end of said belt webbing is secured to said one of the vehicle structure and the passenger seat assembly, and said second end of said belt webbing is coupled to said first opening of said second load bearing member; and
   a fastener, wherein said aperture is configured to sufficiently align with said second opening to define a channel when said receiving portion is in receipt of said flange portions, said fastener being disposed within said channel and configured to press said first load bearing member to said second load bearing member to confirm that said first load bearing member is interlocked with said second load bearing member, but wherein said second load bearing member stays interlocked with said first load bearing member under said tensile loads without dependence upon said fastener.

2. The seat belt assembly of claim 1, wherein said second end of said first load bearing member is operatively connected to said one of the vehicle structure and the passenger seat assembly via a pretensioner.

3. The seat belt assembly of claim 2, wherein said second end of said first load bearing member is operatively secured to the seat assembly via said pretensioner and said first end of said belt webbing is retractably secured to the vehicle structure via a retractor.

4. The seat belt assembly of claim 3, wherein said fastener is selected from the group consisting of a rivet, a bolt, a screw, a key, a retainer, a latch, a weld, and a push pin.

5. The seat belt assembly of claim 4, wherein said first end of said first load bearing member further includes a stepped surface, said flange portions being displaced laterally outward therefrom, and said receiving portion of said second load bearing member defines a third opening configured to receive said flange portions and thereby interlock said first load bearing member with said second load bearing member.

6. The seat belt assembly of claim 5, wherein said first opening is sufficiently oblong to accommodate coupling with said second end of the belt webbing, said second opening is circular, and said third opening is T-shaped.

7. The seat belt assembly of claim 6, wherein said first load bearing member includes a substantially cylindrical middle portion and said second load bearing member is substantially flat with uniform thickness.

8. The seat belt assembly of claim 4, wherein said first end of said first load bearing member further includes a substantially flat surface which defines said flange portions displaced normal to the substantially flat surface, and said receiving portion includes at least one indentation configured for orthogonal receipt of said flange portions to thereby interlock said upper anchor with said lower anchor to withstand tensile loads.

9. The seat belt assembly of claim 4, wherein said first end of said first load bearing member further includes a substantially flat surface which defines said flange portions which extend laterally outward, and said receiving portion includes at least two stops configured for orthogonal receipt of said flange portions to thereby interlock said upper anchor with said lower anchor to withstand tensile loads.

10. A method of installing a seat belt assembly having a belt webbing, a latch plate, and a belt buckle to a vehicle having a seat assembly and vehicle structure, the method comprising the steps of:
   securing the belt buckle to at least one of the seat assembly and the vehicle structure;
   coupling a first end of the belt webbing to at least one of the seat assembly and the vehicle structure;
   coupling a second end of the belt webbing to a first end of an upper anchor, wherein the latch plate is slidably supported by the belt webbing and movable between said first and second ends of the belt webbing;
   coupling a first end of a lower anchor to at least one of the seat assembly and the vehicle structure, said lower anchor having a second end defining flange portions configured to mate with a receiving portion defined by a second end of said upper anchor;
   mounting the seat assembly to the vehicle structure;
   mating said flange portions of said lower anchor with said receiving portion of said upper anchor thereby operatively interlocking said lower anchor to said upper anchor to withstand tensile loads; and
   confirming that said upper anchor is interlocked with said lower anchor by pressing said upper anchor to said lower anchor with a fastener, but keeping said upper anchor interlocked with said lower anchor under said tensile loads without dependence upon said fastener.

11. The method of claim 10, wherein said coupling of said first end of the webbing is to the vehicle structure.

12. The method of claim 11, wherein said coupling of said first end of said lower anchor is to the seat assembly.

* * * * *